US012275866B1

(12) United States Patent
Yoon et al.

(10) Patent No.: US 12,275,866 B1
(45) Date of Patent: Apr. 15, 2025

(54) BIODEGRADABLE THERMAL ADHESIVE COATING COMPOSITION AND METHOD OF PREPARATION THEREOF

(71) Applicant: EVERCHEMTECH CO., LTD, Hwaseong-si (KR)

(72) Inventors: Chan Suk Yoon, Jeonju-si (KR); Seul Bi Lee, Suwon-si (KR); Seong Young Kwon, Seoul (KR)

(73) Assignee: EVERCHEMTECH CO., LTD, Hwaseong-si (KR)

( * ) Notice: Subject to any disclaimer, the term of this patent is extended or adjusted under 35 U.S.C. 154(b) by 0 days.

(21) Appl. No.: 18/530,318

(22) Filed: Dec. 6, 2023

(30) Foreign Application Priority Data

Oct. 17, 2023 (KR) .................. 10-2023-0139005

(51) Int. Cl.
| | | |
|---|---|---|
| *C09J 103/02* | (2006.01) | |
| *C09J 11/04* | (2006.01) | |
| *C09J 11/06* | (2006.01) | |
| *C09J 11/08* | (2006.01) | |

(52) U.S. Cl.
CPC ............. *C09J 103/02* (2013.01); *C09J 11/04* (2013.01); *C09J 11/06* (2013.01); *C09J 11/08* (2013.01); *C09J 2301/408* (2020.08); *C09J 2301/50* (2020.08)

(58) Field of Classification Search
CPC . C09J 103/02; C09J 11/04; C09J 11/06; C09J 11/08; C09J 2301/408; C09J 2301/50
See application file for complete search history.

(56) References Cited

U.S. PATENT DOCUMENTS

| | | | |
|---|---|---|---|
| 4,804,414 | A | 2/1989 | Gleason |
| 5,756,194 | A | 5/1998 | Shogren et al. |
| 6,235,815 | B1 | 5/2001 | Loercks et al. |
| 6,590,019 | B2 | 7/2003 | Dheret et al. |
| 2022/0275201 | A1 | 9/2022 | Dong et al. |

FOREIGN PATENT DOCUMENTS

| | | |
|---|---|---|
| CN | 1091118 C | 9/2002 |
| CN | 109642118 A | 4/2019 |
| JP | 2016164149 A | 9/2016 |
| KR | 101742708 B1 | 6/2017 |
| KR | 10-2399861 B1 | 5/2022 |

OTHER PUBLICATIONS

Taiwanese Patent Office Office Action for Application No. 11320784160 Issued on Aug. 1, 2024.
Search Report of European Patent Office issued on Mar. 4, 2024.

*Primary Examiner* — Christopher W Raimund
(74) *Attorney, Agent, or Firm* — ZION IP; Byungwoong Park (57) ABSTRACT

The present disclosure relates to a biodegradable thermal adhesive coating composition and a method of preparation thereof, and more specifically, it relates to a biodegradable thermal adhesive coating composition, which is biodegradable in order to be environment-friendly, excellent in its adhesion to substrates of various materials, such as paper, plastic, etc., water-resistant, stable in the viscosity change, and suitable for a production process using thermal adhesion, and a method of preparation thereof.

5 Claims, 5 Drawing Sheets

BIODEGRADABLE THERMAL ADHESIVE COATING COMPOSITION AND METHOD OF PREPARATION THEREOF

CROSS REFERENCE TO RELATED APPLICATION

This application claims priority to Korea Patent Application No. 10-2023-0139005 filed on Oct. 17, 2023, which is hereby incorporated by reference in its entirety.

BACKGROUND

1. Field of Technology

The present disclosure relates to a biodegradable thermal adhesive coating composition and a method of preparation thereof. More specifically, it relates to a biodegradable thermal adhesive coating composition, which is biodegradable in order to be environment-friendly, excellent in its adhesion to substrates of various materials, such as paper, plastic, etc., water-resistant, stable in the viscosity change, and suitable for a production process using thermal adhesion, and a method of preparation thereof.

For preparation of a biodegradable thermal adhesive coating composition according to the subject disclosure, neither adhesives nor lamination equipment are required. Accordingly, production costs and environmental impacts are reduced so that the composition of the subject disclosure may be used in various areas.

2. Related Technology

In modern society, various fast foods or foods packaged with disposable containers are widely used, and consequently, food package materials are also widely used. Such food package materials need to provide appropriate barrier properties against moisture or air for maintaining the freshness and taste of food, have an excellent adhesion to substrates, and have excellent environment-friendliness and human body compatibility in consideration of the environment and health. In addition to the food package materials, other various package materials are used for such as things as medical supplies and infusion solution bags which require water resistance, barrier properties, biodegradability, environment-friendliness, etc. However, conventional package materials have been made of laminating films such as PE and PP plastics by means of thermal adhesive materials. Since such materials are not biodegradable, they are not environment-friendly.

Materials based on starch, which are being developed as alternative materials, are excellent for recycling and environment-friendliness. However, they have a problem in that hydrogen bonds between starch chains increase as time elapses after starch gelatinization, leading to an increase of viscosity of a reactant, and thus, the distribution of such materials is impossible.

Accordingly, a composition, which can be applied to various substrates of papers, metals, glasses, plastics, etc. and which is environment-friendly and harmless to human bodies, has good thermal adhesion and water resistance, and is stable in its viscosity, is required.

The discussions in this section are only to provide background information and do not constitute an admission of prior art.

SUMMARY

In order to solve problems of conventional arts, the present disclosure is to provide a thermal adhesive coating composition which is biodegradable and has excellent properties and a method of preparation thereof. In particular, the present disclosure is to provide a biodegradable thermal adhesive coating composition that can be applied to various types of substrates, can realize stable viscosity because no aging phenomenon over time occurs, and can maintain a constant adhesive strength, and a method of preparation thereof.

To this end, the present disclosure provides a biodegradable thermal adhesive coating composition comprising thermoplastic starch (TPS), a pH regulating agent, a viscosity stabilizing agent, a first solvent, a second solvent, and a natural resin.

The present disclosure also provides a method of preparation of a degradable thermal adhesive coating composition comprising: a) adding a pH regulating agent to a first solvent; b) adding thermoplastic starch to a solution of a); c) heating the solution of b); d) adding a viscosity stabilizing agent to the heated solution of c) for their reaction; e) cooling the solution of d); f) adding a second solvent to the cooled solution; g) adding a natural resin to the solution of f); h) stirring the solution of g) and retrieving a final solution.

A biodegradable thermal adhesive coating composition according to the present disclosure has excellent thermal adhesive strength and excellent durability, and it is adjustable in its viscosity and applicable to various substrates of papers, plastics, etc. Therefore, it is expected to be used for package materials in various areas, including food package materials.

BRIEF DESCRIPTION OF THE DRAWINGS

In order that the disclosure may be well understood, there will now be described various forms thereof, given by way of example, reference being made to the accompanying drawings, in which.

DETAILED DESCRIPTION OF EXEMPLARY EMBODIMENTS

The present disclosure will now be described in detail in reference to specific embodiments. It is noted that the embodiments described below are only preferred specific embodiments of the present disclosure and a scope of a patent right of the present disclosure is not limited by the descriptions regarding the embodiments.

In the present disclosure, "%" means weight %.

The term "biodegradable" generally means that a substance can be degraded by the action of natural microorganisms such as bacteria, mycetes and algae, or environmental factors such as heat, moisture, or others.

The "thermoplastic starch" means what is obtained by treating starch with a plasticizer.

The present disclosure relates to a biodegradable thermal adhesive coating composition comprising thermoplastic starch (TPS), a pH regulating agent, a viscosity stabilizing agent, a first solvent, a second solvent, and a natural resin.

In an aspect, the composition comprises 7 to 25 weight % of thermoplastic starch, 1 to 5 weight % of a pH regulating agent, 0.08 to 1.0 weight % of a viscosity stabilizing agent, 3 to 20 weight % of a second solvent, 3 to 35 weight % of a natural resin, and the remainder being a first solvent.

In an aspect, the thermoplastic starch is added in an amount of 7 to 25 weight % of the biodegradable thermal adhesive coating composition. When the content of the thermoplastic starch satisfies the above range, it is advantageous in realization of a thermal adhesive strength and productivity. When the content of the thermoplastic starch is less than 7 weight %, it would be disadvantageous in productivity because the content of a solvent will be relatively greater, which results in requiring more time to dry the solvent in the process, and when the content of the thermoplastic starch is above 25 weight %, the viscosity would highly increase, which leads to difficulty in a coating process.

According to the present disclosure, for adhesion and coating stability, an acryl resin, a silane hydrolysate, a urethane resin, a polyolefine resin, a biodegradable resin, or the like may be mixed or combined with the starch. The biodegradable resin may comprise at least one of PLA (polylactic acid), PCL(polycaprolactone), PPC(polypropylene carbonate), PGA(polyglycolic acid), PBAT(polybutylene adipate terephthalate), PBS(polybutylene succinate), PHA(polyhydroxyalkanoate), TPS(thermoplastic starch), and PEC(polyethylene carbonate). By combining a hard biodegradable resin (for example, PLA) and a soft biodegradable resin (for example, PCL, PPC), various coating materials may be produced and biodegradable films with various properties may be formed by using the coating materials. For example, by mixing a hard biodegradable resin and a soft biodegradable resin in a solution, a biodegradable film excellent in all the properties such as barrier properties, coatability, mechanical strength, etc. may be formed. In addition, papers coated with the biodegradable film may be used in various ways and they are environment-friendly.

A pH regulating agent stimulates a gelatinization of starch and inhibits aging. As far as it is an alkali substance, there is no particular limitation and anyone selected among publicly known materials may be used. In an aspect, a pH regulating agent may be anyone selected from sodium hydroxide, potassium hydroxide, calcium hydroxide, and sodium carbonate, which are inorganic alkali compounds. In addition, a pH regulating agent may comprise, as organic alkali compounds, a primary amine, a secondary amine, a tertiary amine, or their combinations. The primary amine may be at least one selected from a group consisting of Methylamine, Methanolamine, Ethylamine, Ethanolamine, Propylamine, 3-Amino-1-propanol, Isopropylamine, Monoisopropanolamine, tert-butylamine, Butylamine, Hexylamine, Dodecylamine, Cyclohexylamine, Ethylenediamine, and Hexamethylenediamine. The secondary amine may be at least one selected from a group consisting of Dimethylamine, Diethylamine, Diethanolamine, Dipropylamine, N-Ethylmethylamine, N-Methylpropylamine, 3-(METHYLAMINO)-1-PROPANOL, N-Isopropylmethylamine, Dibutylamine, Di-sec-butylamine, Dioctylamine, N-methylcyclohexylamine, Pyrrolidine, Pyridine, and Diethylenetriamine. The tertiary amine may be at least one selected from a group consisting of Trimethylamine, Trimethanolamine, Triethylamine, Triethanolamine, Dimethylethanolamine, N,NDimethylpropylamine, N,N-Dimethylbutylamine, 3-Dimethylamino-1-propanol, N,NDimethyldodecylamine, N,N-Dimethyloctadecylamine, Tripentylamine, N,NDimethylcyclohexylamine, 3-(Dimethylamino)benzyl alcohol, and N,N,N',N'-Tetramethyl-1,4-butanediamine.

In particular, sodium hydroxide may be used. In an aspect, the pH regulating agent may be used in a range of 1 to 5 weight %. When it is added in an amount of less than 1 weight %, the gelatinization of starch is insignificant, and thus, the aging inhibition effect decreases and, when it is added in an amount of more than 5 weight %, a coating agent may comprise an excess amount of a hydrophilic material, which results in a decrease of water resistance of a coating layer.

A viscosity stabilizing agent inhibits an increase of viscosity by being present in a form of a bulky mono-molecule inside starch chains to prevent the hydrogen bonds between the starch chains. In addition, it is possible to obtain desired viscosity depending on types of substances. Further, since it has a high number of carbons and a low number of functional groups, it may contribute to improvement of water resistance.

In an aspect, as the viscosity stabilizing agent, at least any one selected from a group, consisting of lecithin, lysolecithin, glycerin fatty acid ester, sucrose fatty acid ester, propylene glycol fatty acid ester, whey protein isolate (9410 WPI), whey protein concentrate (8000 WPC), soy protein isolate (SPI), rice protein isolate (RPI), oat protein isolate (OPI), pea protein isolate (PPI), casein, sodium caseinate, corn zein, gelatin, gluten, dextrin, carrageenan, Tween80, Tween20, and cellulose, may be used. In an aspect, the viscosity stabilizing agent may be used in a range of 0.08 to 1.0 weight %. When it is added in an amount of less than 0.08 weight %, there is no effect to prevent the increase of viscosity and, when it is added in an amount of more than 1.0 weight %, the thermal adhesion will decrease. In an aspect, it is preferably used in a range of 0.1 to 0.5 weight %.

The first solvent is not limited. However, it may be at least any one of water, distilled water, and purified water.

For the second solvent, alcohols with 1 to 6 of carbon number may be used. For example, it may be at least any one selected from a group consisting of alcohols such as methanol, ethanol, n-propanol, isopropanol, n-butanol, iso-butanol, sec-butanol, tert-butanol, n-amyl alcohol, iso-amyl alcohol, sec-amyl alcohol, tert-amyl alcohol, 1-ethyl-1-propanol, 2-methyl-1-butanol, n-hexanol, cyclohexanol, etc. and their mixtures.

The second solvent improves the coatability and the production speed of coated sheets and inhibits enzymatic action so as to prevent decomposition when materials based on natural substances are used.

In an aspect, the second solvent is used in a range of 3 to 20 weight %. When it is added in an amount of less than 3 weight %, there is no effect of improving coatability and productivity and, when it is added in an amount of more than 20 weight %, there is a possibility that starch is precipitated. In an aspect, the content of the second solvent is preferably 3 to 10 weight %.

In an aspect, a composition according to the present disclosure may additionally comprise a natural resin, preferably shellac. Shellac, which is a kind of animal resin, is produced by refining or bleaching yellowish resin secreted by lac bugs and generally used in paints or finishing materials. According to the present disclosure, shellac is used as a coating agent for the purpose of increasing water resistance and antibiosis. In an aspect, shellac is used in a range of 3 to 35 weigh %. When it is added in an amount of less than 3 weight %, there is no effect of improving water resistance and antibiosis and, when it is added in an amount of more than 35 weight %, there occurs shock with starch so that the shellac and starch lump, and thus, it might be difficult to use shellac as a coating agent. In an aspect, the content of the shellac is preferably 15 to 30 weight %.

In addition to the above-described components, the composition according to the present disclosure may further comprise other additives, such as a dispersion adjuvant, a melting stabilizing agent, a processing stabilizing agent, a heat stabilizing agent, a light stabilizing agent, an antioxidant, a heat aging stabilizing agent, a whitening agent, an antiblocking agent, a bonding agent, a lubricating agent, an aqueous polymer, a filling agent, or the like. The dispersion adjuvant may be used, for example, to assist formation of a uniform dispersion solution and to delay or prevent component separation. In addition, the dispersion adjuvant may improve water dispersibility of the coating composition.

Also, the present disclosure provides a method of preparation of a degradable thermal adhesive coating composition comprising: a) adding a pH regulating agent to a first solvent; b) adding thermoplastic starch to a solution of a); c) heating the solution of b); d) adding a viscosity stabilizing agent to the heated solution of c) for their reaction; e) cooling the solution of d); f) adding a second solvent to the cooled solution; g) adding a natural resin to the solution of f); h) stirring the solution of g) and retrieving a final solution.

In a), the pH regulating agent may be added to the first solvent while stirring the solution by using a mechanical stirrer. Then, thermoplastic starch may be added to the solution in b) and the solution may be heated to 60 to 90° C. in c). However, the present disclosure is not limited thereto.

In d), the viscosity stabilizing agent may be added to the solution for their reaction while slowly stirring the solution. The viscosity stabilizing agent may be added in a content appropriate for each of the above-described types of viscosity stabilizing agents. Then, the solution including the viscosity stabilizing agent may be left to react for 1 to 4 hours, however, the present disclosure is not limited thereto.

In e), the reacted solution may be cooled to room temperature.

In f), the second solvent may be slowly added to the cooled solution while stirring the solution, then, the natural resin may be added to the solution in g). In h), the solution may be stirred and the final solution is retrieved. The solution may be left to react for 10 to 30 minutes, however, the present disclosure is not limited thereto.

In an aspect, the natural resin is shellac.

In an aspect, the prepared biodegradable thermal adhesive coating composition may additionally be dispersed by using an ultrasonic disperser, a high-pressure disperser, or a homogenizer for a uniform dispersion. Preferably, the coating composition may be dispersed by using a high-pressure method.

In an aspect, properties of the coating composition may be regulated through an additional heating process and/or pressurizing process and the remaining solvent may be removed by a drying process.

The biodegradable thermal adhesive coating composition may be provided in a thickness of 0.1 m to 90 m on a substrate. As the thickness becomes greater, the thermal adhesive strength becomes higher and as the thickness is reduced, the production process becomes more economical.

There is no limit to materials for a substrate, to which a biodegradable thermal adhesive coating composition is applied. It may be paper, plastic or metal. In addition, functional layers for providing properties may be comprised between a substrate and a coating layer. For example, a primer layer or an oxygen barrier layer may selectively or simultaneously be laminated. The method may further comprise applying the primer layer or the oxygen barrier layer in a thickness of 1 m to 10 m. For example, when a coating solution is applied on a film coated (surface-treated) with a urethan primer, the adhesion is improved so that the coating layer on the surface of the film shall not easily be delaminated. In order to improve the adhesion, a surface treatment with plasma or corona to the film may be additionally performed.

In an aspect, providing the biodegradable thermal adhesive coating composition on a substrate may be performed by coating the substrate with the biodegradable thermal adhesive coating composition. For example, s spray coating, a spin coating, a dipping coating, a gravure coating, a micro gravure coating, a die coating, a comma coating, a knife coating, a direct coating, a bar coating, or the like may be used, however, the present disclosure is not limited thereto.

After the composition has been coated, the solvent on the substrate may be evaporated. Despite not being limited thereto, the evaporation may be performed by using a hot-air drying device at 60 to 150° C. for 1 to 5 minutes, preferably at 100° C. for 2 to 3 minutes.

Hereinafter, the following embodiments are to demonstrate the present disclosure without limiting the scope of the present disclosure.

Embodiment 1

1.5 g(1.15 weight %) of 1N NaOH was added to 88.4 g(68 weight %) of distilled water as a first solvent while stirring the solvent by using a mechanical stirrer at 300 rpm. Then, 10 g(7.69 weight %) of thermoplastic starch was added and the temperature of a reactant was raised to 80° C. When the temperature reached 80° C., 0.1 g(0.08 weight %) of lecithin was slowly added while stirring the reactant at 500 rpm and the reactant was left to react for 1 hour at 80° C., then cooled. 10 g(7.69 weight %) of ethanol was slowly added as a second solvent while stirring 100 g of the reactant at a room temperature at 1,000 rpm by using the mechanical stirrer. 10 minutes after the ethanol has been added, 20 g(15.38 weight %) of shellac was added to the reactant and the reactant was stirred for 20 minutes. Then, the reactant was retrieved. A finally prepared composition was dispersed by using a high-pressure disperser (1000 bar, 3 passes) such that the final composition has uniform grain sizes of about 100 nm.

Embodiments 2 to 25

Coating compositions were prepared in the same process as that for embodiment 1 with different components and contents as described in table 1.

Comparative Examples 1 to 11

Coating compositions were prepared in the same process as that for embodiment 1 with different components and contents as described regarding comparative examples 1 to 11 in table 1.

TABLE 1

| | Thermoplastic starch | pH regulating agent | Viscosity stabilizing agent | First solvent | Second solvent | Shellac |
|---|---|---|---|---|---|---|
| Embodiment 1 | TPS 7.69 | NaOH 1.15 | Lecithin 0.08 | Distilled water 68.00 | Ethanol 7.69 | 15.38 |
| Embodiment 2 | TPS 7.69 | NaOH 1.15 | Lecithin 0.77 | Distilled water 67.31 | Ethanol 7.69 | 15.38 |
| Embodiment 3 | TPS 15.38 | NaOH 1.54 | Lecithin 0.08 | Distilled water 59.92 | Ethanol 7.69 | 15.38 |
| Embodiment 4 | TPS 15.38 | NaOH 1.54 | Lecithin 0.15 | Distilled water 59.85 | Ethanol 7.69 | 15.38 |
| Embodiment 5 | TPS 15.38 | NaOH 1.54 | Lecithin 0.77 | Distilled water 59.23 | Ethanol 7.69 | 15.38 |
| Embodiment 6 | TPS 23.08 | NaOH 1.92 | Lecithin 0.04 | Distilled water 51.88 | Ethanol 7.69 | 15.38 |
| Embodiment 7 | TPS 23.08 | NaOH 1.92 | Lecithin 0.08 | Distilled water 51.85 | Ethanol 7.69 | 15.38 |
| Embodiment 8 | TPS 21.74 | NaOH 1.81 | Lecithin 0.22 | Distilled water 48.70 | Ethanol 2.17 | 25.36 |
| Embodiment 9 | TPS 27.27 | NaOH 2.27 | Lecithin 0.27 | Distilled water 61.09 | Ethanol 4.55 | 4.55 |
| Embodiment 10 | TPS 20.69 | NaOH 1.72 | Lecithin 0.21 | Distilled water 46.34 | Ethanol 3.45 | 27.59 |
| Embodiment 11 | TPS 26.55 | NaOH 2.21 | Lecithin 0.27 | Distilled water 59.47 | Ethanol 8.85 | 2.65 |
| Embodiment 12 | TPS 26.09 | NaOH 2.17 | Lecithin 0.26 | Distilled water 58.43 | Ethanol 8.70 | 4.35 |
| Embodiment 13 | TPS 20.69 | NaOH 1.72 | Lecithin 0.21 | Distilled water 46.34 | Ethanol 6.90 | 24.14 |
| Embodiment 14 | TPS 20.00 | NaOH 1.67 | Lecithin 0.20 | Distilled water 44.80 | Ethanol 6.67 | 26.67 |
| Embodiment 15 | TPS 18.75 | DMEA 1.56 | Lecithin 0.19 | Distilled water 42.00 | Ethanol 6.25 | 31.25 |
| Embodiment 16 | TPS 22.22 | NaOH 1.85 | Lecithin 0.22 | Distilled water 49.78 | Ethanol 22.22 | 3.70 |
| Embodiment 17 | TPS 20.00 | NaOH 1.67 | Lecithin 0.20 | Distilled water 44.80 | Ethanol 20.00 | 13.33 |
| Embodiment 18 | TPS 17.65 | NaOH 1.47 | Lecithin 0.18 | Distilled water 39.53 | Ethanol 17.65 | 23.53 |
| Embodiment 19 | TPS 18.75 | NaOH 1.56 | Lecithin 0.19 | Distilled water 42.00 | Ethanol 25.00 | 12.50 |
| Embodiment 20 | TPS 23.08 | NaOH 1.92 | Lecithin 0.77 | Distilled water 51.15 | Ethanol 7.69 | 15.38 |
| Embodiment 21 | TPS 23.08 | NaOH 1.92 | Lecithin 1.54 | Distilled water 50.38 | Ethanol 7.69 | 15.38 |
| Embodiment 22 | TPS 23.08 | DMEA 1.92 | Lecithin 0.23 | Distilled water 51.69 | Ethanol 7.69 | 15.38 |
| Embodiment 23 | TPS 23.08 | NaOH 1.92 | Tween 80 0.23 | Distilled water 51.69 | Ethanol 7.69 | 15.38 |
| Embodiment 24 | TPS 23.08 | NaOH 1.92 | Whey protein 0.23 | Distilled water 51.69 | Ethanol 7.69 | 15.38 |

TABLE 1-continued

| | Thermoplastic starch | pH regulating agent | Viscosity stabilizing agent | First solvent | Second solvent | Shellac |
|---|---|---|---|---|---|---|
| Embodiment 25 | TPS 23.08 | NaOH 1.92 | Sodium casein 0.23 | Distilled water 51.69 | Ethanol 7.69 | 15.38 |
| Comparative 1 | TPS 30.00 | NaOH 0.00 | Lecithin 0.00 | Distilled water 70.00 | Ethanol 0.00 | 0.00 |
| Comparative 2 | TPS 27.27 | NaOH 0.00 | Lecithin 0.00 | Distilled water 63.64 | Ethanol 9.09 | 0.00 |
| Comparative 3 | TPS 25.00 | NaOH 0.00 | Lecithin 0.00 | Distilled water 58.33 | Ethanol 0.00 | 16.67 |
| Comparative 4 | TPS 30.00 | NaOH 2.50 | Lecithin 0.00 | Distilled water 67.50 | Ethanol 0.00 | 0.00 |
| Comparative 5 | TPS 27.27 | NaOH 2.27 | Lecithin 0.00 | Distilled water 61.36 | Ethanol 9.09 | 0.00 |
| Comparative 6 | TPS 25.00 | NaOH 2.08 | Lecithin 0.00 | Distilled water 56.25 | Ethanol 0.00 | 16.67 |
| Comparative 7 | TPS 30.00 | NaOH 0.00 | Lecithin 0.30 | Distilled water 69.70 | Ethanol 0.00 | 0.00 |
| Comparative 8 | TPS 27.27 | NaOH 0.00 | Lecithin 0.27 | Distilled water 63.36 | Ethanol 9.09 | 0.00 |
| Comparative 9 | TPS 25.00 | NaOH 0.00 | Lecithin 0.25 | Distilled water 58.08 | Ethanol 0.00 | 16.67 |
| Comparative 10 | TPS 22.22 | NaOH 1.85 | Lecithin 0.22 | Distilled water 49.78 | Ethanol 0.00 | 25.93 |
| Comparative 11 | TPS 27.27 | NaOH 2.27 | Lecithin 0.27 | Distilled water 61.09 | Ethanol 9.09 | 0.00 |

Comparative Example 121

A coating composition was prepared in the same process as that for embodiment 1, except that the high-pressure dispersing process after having retrieved the composition was not performed.

Experimental Example 1

Measurement of Liquid Stability

Figure 1:
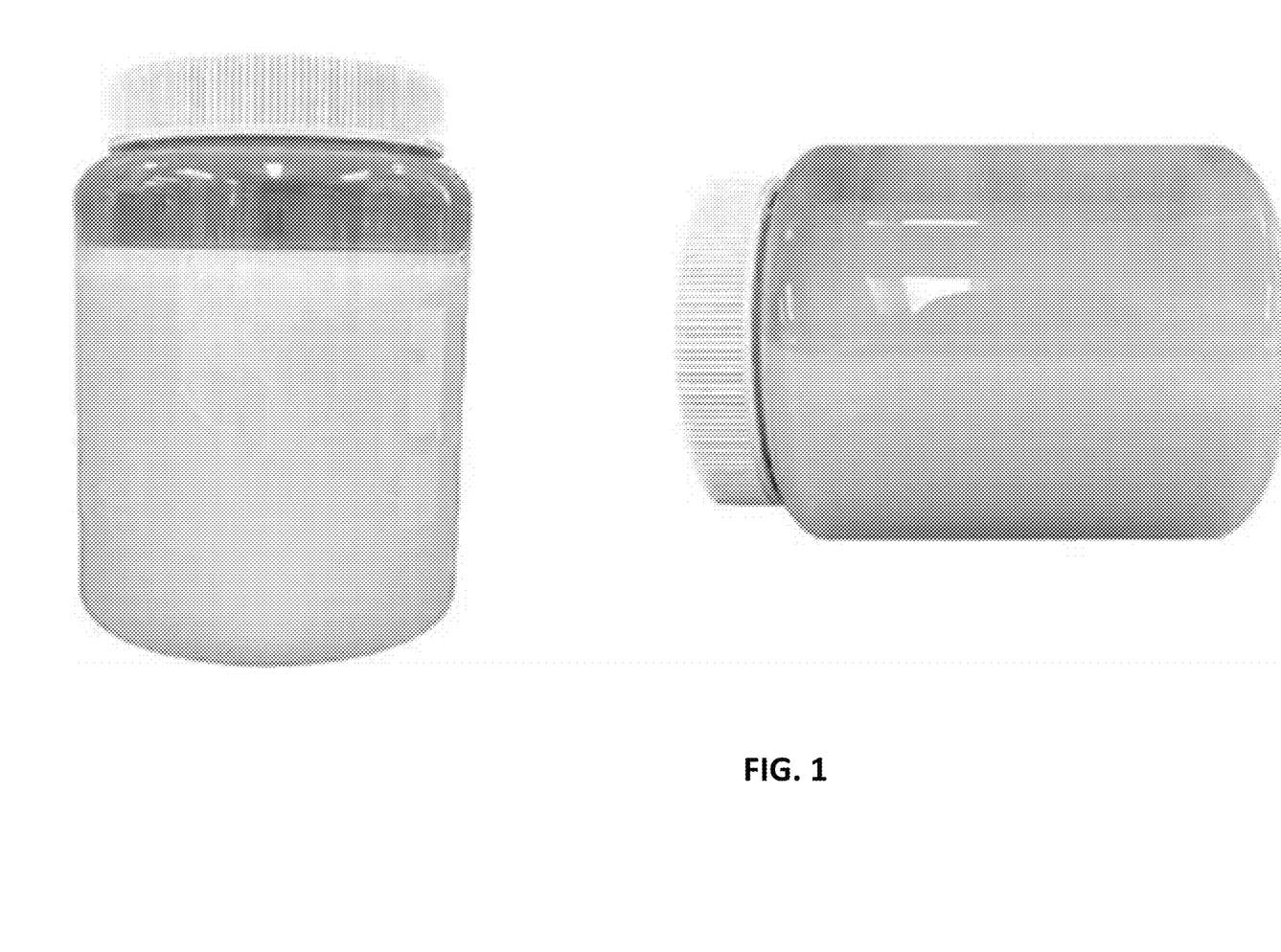
FIG. 1 shows liquid stability of a composition of embodiment 13.
Figure 2A:
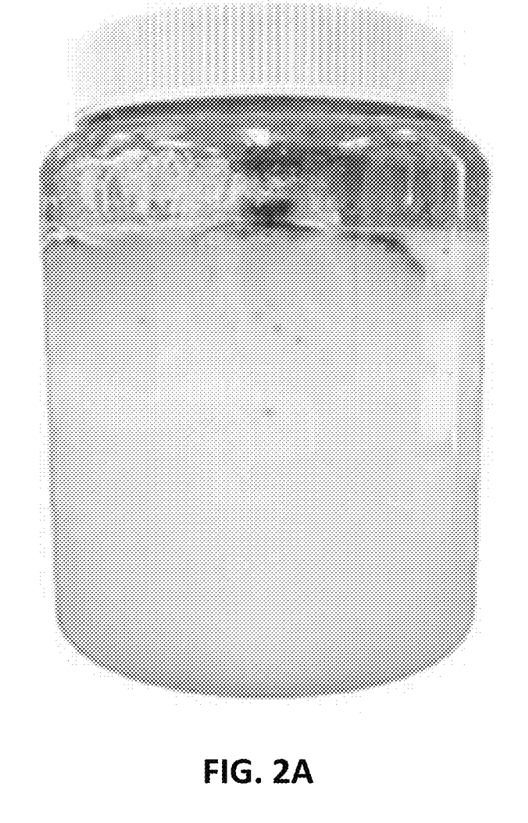
FIG. 2A shows a composition of comparative example 1.
Figure 2B:
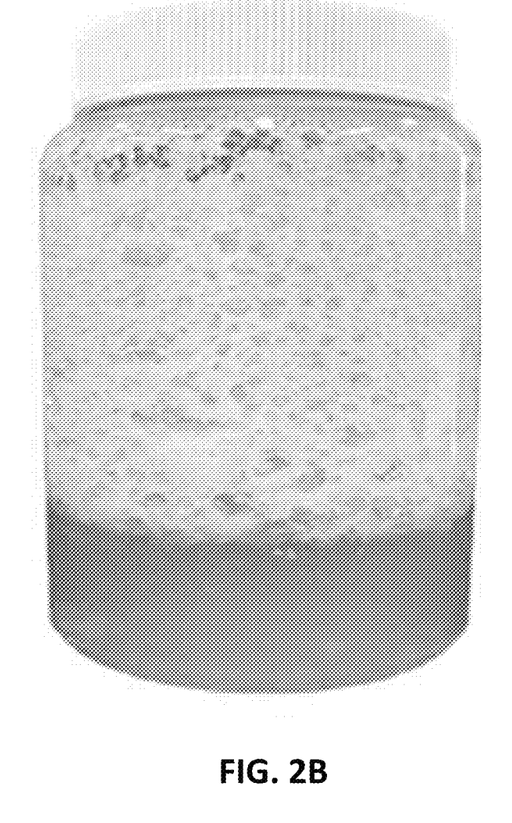
FIG. 2B shows liquid stability of a composition of comparative example 2.
Figure 3:
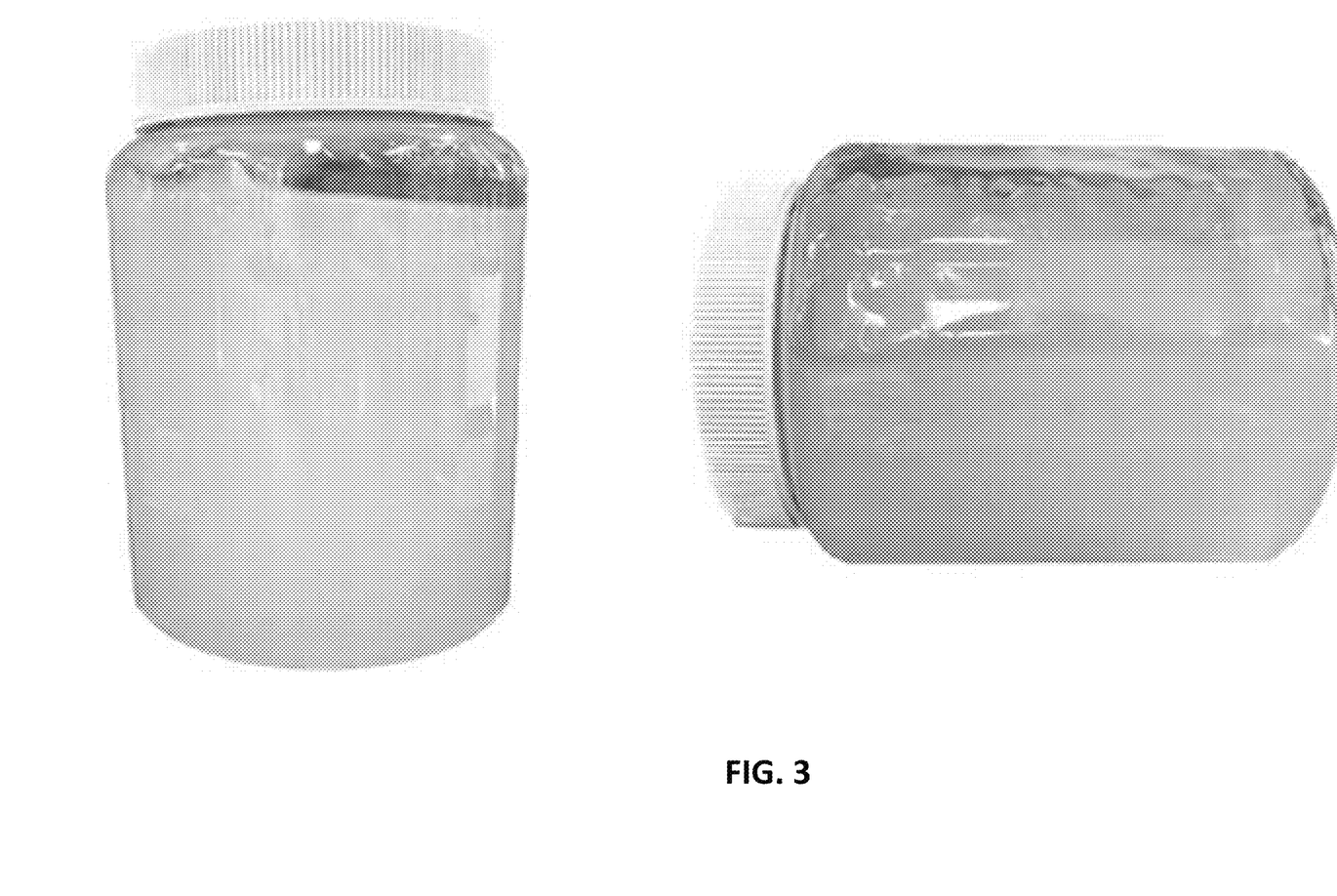
FIG. 3 shows liquid stability of a composition of comparative example 3.

The compositions of the above embodiments and the comparative examples were kept for 30 days at room temperature and room humidity and their liquid stabilities were observed with the naked eye. FIG. 1 shows the liquid stability of a composition of embodiment 1. FIG. 2A and FIG. 2B respectively show the liquid stabilities of compositions of comparative examples 1 and 2. FIG. 3 shows the liquid stability of a composition of embodiment 12, which did not undergo the dispersing process.

The composition of embodiment 1 was maintained uniformly and stable, whereas the compositions of comparative examples 1 and 2 were respectively rotten or gelated, and thus, they could not be used as coating compositions. The composition of comparative example 12 had a thickening phenomenon, which is not desirable for a coating composition.

Experimental Example 2

Measurement of Viscosity

Viscosities of the compositions prepared according to the above embodiments and the comparative examples were measured (spindle: No. 06, rpm: 100 rpm) at room temperature and room humidity (20±5° C., 55±5%) by using a viscometer (DV2TRV of Brookfield). The results are shown in table 2.

Experimental Example 3

Measurement of Water Absorptiveness

Figure 4A:
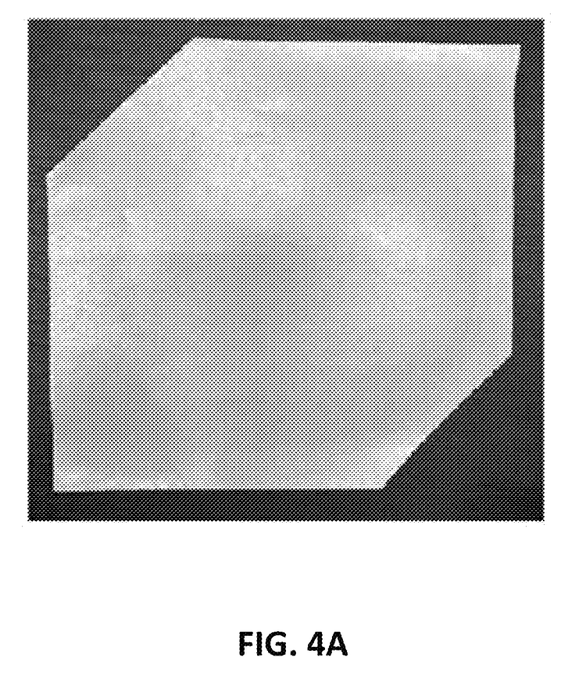
FIG. 4A shows water absorptiveness of a composition of embodiment 13.
Figure 4B:
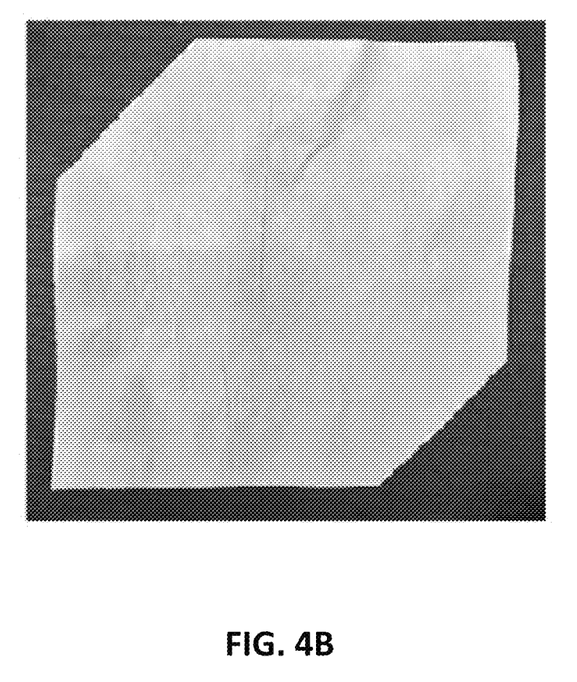
FIG. 4B shows water absorptiveness of a composition of comparative example 11.

Base papers were well stuck on a glass plate, about 1~2.5 g of the coating compositions prepared according to the above embodiments and the comparative examples were dropped on the upper sides of the base papers. The coating compositions were applied on the base papers by means of a bar coater to have a uniform thickness. The applied coating compositions were dried by means of a hot-air drying device at 100° C. for 2 minutes to prepare the coated papers. The water absorptiveness was evaluated according to the Cobb test method (TAPPI T441) by pouring distilled water over each specimen of 100 cm$^2$ of the originally prepared coated papers, leaving it for 60 seconds, and measuring its weights before and after the test. The results are shown in table 2. FIG. 4A shows the water absorptiveness of the composition of embodiment 1 and FIG. 4B shows the water absorptiveness of the composition of comparative example 1. In observation with the naked eye, the paper with the composition of embodiment 1 was stable and without change, whereas the paper with the composition of comparative example 1 absorbed water and the paper was crumpled.

Experimental Example 4

Measurement of Heat-Adhesive Strength

The measurement was made by using the coated papers in experimental example 3 and a heat gradient tester (QM930D of Qmesys). The heat adhesion was made by setting the lower heating plate of the heat gradient tester at 60° C. and the upper heating plate thereof at 150° C., placing two sheets of the coated papers between the heating plates such that the coating layers of the coated papers faced each other, and pressurizing the two sheets for 1 second. A specimen was prepared by cutting out the heat-adhered coated papers to have 10 mm of width and 100 mm of length (in which the heat-adhered area has 10 mm of width and 25 mm of length) and its adhesive strength was measured by means of a universal material testing machine (LS1 of Lloyd). The results are shown in table 2.

TABLE 2

|  | Viscosity | | | | Water Absorptiveness (Cobb 60) | Heat-Adhesive Strength (gf/15 mm) |
| --- | --- | --- | --- | --- | --- | --- |
|  | beginning | 1 month | 3 months | 6 months | | |
| Embodiment 1 | 270 | 280 | 280 | 300 | 1.3 | 335.20 |
| Embodiment 2 | 230 | 230 | 240 | 240 | 1.1 | 297.16 |
| Embodiment 3 | 360 | 360 | 370 | 380 | 1.2 | 360.44 |
| Embodiment 4 | 340 | 340 | 340 | 350 | 1.1 | 352.38 |
| Embodiment 5 | 310 | 300 | 300 | 300 | 0.8 | 311.17 |
| Embodiment 6 | 510 | 530 | 550 | 580 | 0.6 | 396.03 |
| Embodiment 7 | 500 | 510 | 520 | 530 | 0.6 | 378.52 |
| Embodiment 8 | 480 | 480 | 490 | 510 | 0.6 | 361.94 |
| Embodiment 9 | 440 | 430 | 440 | 440 | 2.1 | 363.56 |
| Embodiment 10 | 420 | 440 | 420 | 420 | 0.5 | 385.48 |
| Embodiment 11 | 460 | 470 | 470 | 470 | 2.6 | 376.65 |
| Embodiment 12 | 460 | 460 | 450 | 450 | 2.0 | 388.04 |
| Embodiment 13 | 400 | 400 | 400 | 400 | 0.6 | 395.12 |
| Embodiment 14 | 400 | 400 | 400 | 400 | 0.5 | 394.33 |
| Embodiment 15 | Shock | — | — | — | — | — |
| Embodiment 16 | 360 | 350 | 360 | 350 | 1.8 | 370.89 |
| Embodiment 17 | 340 | 340 | 340 | 330 | 1.3 | 373.24 |
| Embodiment 18 | 310 | 300 | 310 | 310 | 0.8 | 384.44 |
| Embodiment 19 | Shock | — | — | — | — | — |
| Embodiment 20 | 370 | 370 | 380 | 370 | 0.7 | 216.90 |
| Embodiment 21 | 360 | 350 | 350 | 350 | 0.6 | 148.57 |
| Embodiment 22 | 410 | 400 | 400 | 410 | 0.7 | 390.23 |
| Embodiment 23 | 420 | 430 | 420 | 420 | 0.6 | 362.80 |
| Embodiment 24 | 440 | 440 | 450 | 450 | 0.8 | 367.26 |
| Embodiment 25 | 430 | 440 | 440 | 440 | 0.8 | 370.01 |
| Comparative 1 | 1530 | Rotten | — | — | — | — |
| Comparative 2 | 1370 | 1690 | Gel | — | — | — |
| Comparative 3 | 1240 | 1470 | 1860 | Gel | — | — |
| Comparative 4 | 1120 | 1270 | Rotten | — | — | — |
| Comparative 5 | 1080 | 1360 | Gel | — | — | — |
| Comparative 6 | 1050 | 1180 | 1640 | Gel | — | — |

TABLE 2-continued

|  | Viscosity | | | | Water Absorptiveness (Cobb 60) | Heat-Adhesive Strength (gf/15 mm) |
|---|---|---|---|---|---|---|
|  | beginning | 1 month | 3 months | 6 months | | |
| Comparative 7 | 1580 | Rotten | — | — | — | — |
| Comparative 8 | 1410 | 1440 | 1490 | Gel | — | — |
| Comparative 9 | 1330 | 1380 | 1400 | Gel | — | — |
| Comparative 10 | 450 | 580 | 1130 | Gel | 0.7 | 380.66 |
| Comparative 11 | 470 | 480 | 480 | 480 | 3.8 | 354.28 |

As shown in table 2, the compositions of the embodiments generally had effective properties as adhesive compositions while the compositions of the comparative examples were rotten or gelated so that they could not be applied. Generally, the compositions of embodiments 5 to 8, 10, 13, 14, 20, and 22 to 25 were evaluated to be desirable in their viscosity, water absorptiveness, and adhesive strength. The composition of embodiment 6 had a slightly increased viscosity, the composition of embodiment 8 had a small amount of decreased dryness, the composition of embodiment 11 had high water absorptiveness, the compositions of embodiments 15 and 19 had shock, and the composition of embodiment 21 had low heat-adhesive strength.

Figure 5:
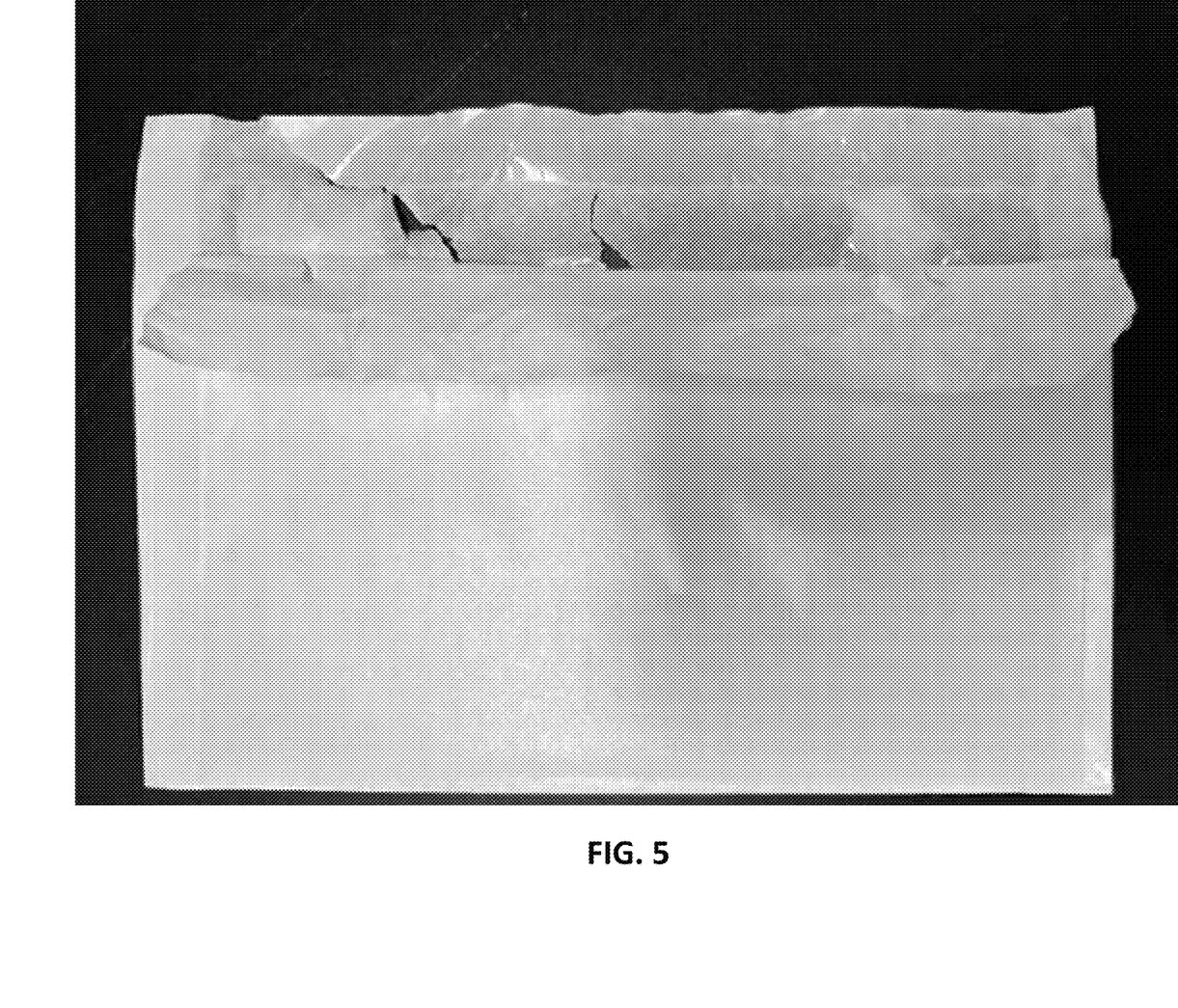
FIG. 5 shows a result of detachment of coated papers after heat-adhesion of them to which a composition of embodiment 4 was applied.

In experimental example 3, a test of detaching the heat-adhered coated papers, to which the composition of embodiment 1 was applied, was additionally made. FIG. 5 shows the result. It could be verified that the sealability was excellent such that the papers were damaged when being detached.

What is claimed is:

1. A method of preparation of a degradable thermal adhesive coating composition comprising:
   a) adding a pH regulating agent to a first solvent;
   b) adding thermoplastic starch to a solution of a);
   c) heating the solution of b);
   d) adding a viscosity stabilizing agent to the heated solution of c) for their reaction;
   e) cooling the solution of d);
   f) adding a second solvent to the cooled solution;
   g) adding a natural resin which is shellac to the solution of f);
   h) stirring the solution of g) and retrieving a final solution, wherein the composition comprises 7 to 25 weight % of the thermoplastic starch, 1 to 5 weight % of the pH regulating agent, 0.1 to 0.5 weight % of the viscosity stabilizing agent, 3 to 10 weight % of the second solvent, 15 to 30 weight % of the shellac, and the remainder being the first solvent.

2. The method of claim 1, wherein the solution is heated to 60 to 90° C. in c).

3. The method of claim 1, wherein the solution is left to react for 1 to 4 hours after the viscosity stabilizing agent has been added in d).

4. The method of claim 1, wherein the solution is left to react for 10 to 30 minutes by being stirred after the shellac has been added to the solution.

5. The method of claim 1, further comprising a high-pressure dispersion process after g) in order to disperse the composition.

* * * * *